United States Patent
Sherman (10) Patent No.: US 10,356,796 B2
(45) Date of Patent: Jul. 16, 2019

(54) SYSTEM FOR AND A METHOD OF IMPROVING INTERFERENCE ROBUSTNESS IN A TELECOMMUNICATION NETWORK

(71) Applicant: ELTA SYSTEMS LTD., Ashdod (IL)

(72) Inventor: Itay Sherman, Hod Hasharon (IL)

(73) Assignee: ELTA SYSTEMS LTD., Ashdod (IL)

( * ) Notice: Subject to any disclaimer, the term of this patent is extended or adjusted under 35 U.S.C. 154(b) by 510 days.

(21) Appl. No.: 14/805,871

(22) Filed: Jul. 22, 2015

(65) Prior Publication Data
US 2016/0050678 A1 Feb. 18, 2016

(30) Foreign Application Priority Data

Aug. 12, 2014 (IL) .......................................... 234086

(51) Int. Cl.
*H04W 72/08* (2009.01)
*H04W 24/02* (2009.01)
*H04L 5/00* (2006.01)

(52) U.S. Cl.
CPC ......... *H04W 72/082* (2013.01); *H04L 5/0048* (2013.01); *H04L 5/0062* (2013.01); *H04L 5/0091* (2013.01); *H04W 24/02* (2013.01)

(58) Field of Classification Search
CPC .............................. H04W 72/00; H04W 72/04; H04W 72/0486; H04W 72/08; H04W 72/082; H04W 72/085
See application file for complete search history.

(56) References Cited

U.S. PATENT DOCUMENTS

| | | | | |
|---|---|---|---|---|
| 2010/0067609 A1* | 3/2010 | Wang | .................... | H04L 5/0062 375/285 |
| 2010/0111208 A1 | 5/2010 | Tsai et al. | | |
| 2010/0220683 A1* | 9/2010 | Novak | ................. | H04L 5/0044 370/330 |
| 2011/0299383 A1* | 12/2011 | Ko | ....................... | H04B 7/0613 370/210 |

(Continued)

FOREIGN PATENT DOCUMENTS

| | | |
|---|---|---|
| WO | 2010/121435 A1 | 10/2010 |
| WO | 2013/089344 A1 | 6/2013 |

OTHER PUBLICATIONS

LG Electronics: "Discussion on EREG definition", 3GPP Draft; RI-123847 Discussion on EREG Definition LG, 3rd Generation Partnership Project (3GPP), Mobile Competence Centre; 650, Route Des Lucioles; F-06921 Sophia-Antipolis Cedex; France vol. RAN WGI, No. Qingdao, China; Aug. 13, 2012 Aug. 17, 2012-Aug. 9, 2012 (Aug. 9, 2012), XP050661708.

*Primary Examiner* — Feben Haile
(74) *Attorney, Agent, or Firm* — Oliff PLC (57) ABSTRACT

The present disclosure provides a method of improving interference robustness in a LTE based wireless communication system. At a transmitting side, a MAC layer outputs MAC data units each including a resource mapping assigning said MAC data units to resource blocks of an LTE frame. The method comprises, at the transmitting side, modifying the MAC data units output by the MAC layer to scramble the resource mapping of said MAC data units thereby providing corresponding scrambled MAC data units including a scrambled resource mapping to a PHY layer of the transmitting side, the scrambled resource mapping being obtained by using a carrier permutation retrievable by a receiving side.

18 Claims, 4 Drawing Sheets

(56) References Cited

U.S. PATENT DOCUMENTS

2012/0230267 A1\* 9/2012 Sundaresan ........... H04W 72/06
 370/329
2015/0110065 A1\* 4/2015 Gaal .................... H04W 16/14
 370/330

\* cited by examiner

SYSTEM FOR AND A METHOD OF IMPROVING INTERFERENCE ROBUSTNESS IN A TELECOMMUNICATION NETWORK

TECHNOLOGICAL FIELD

The present disclosure relates generally to the field of wireless communications. More particularly, the present disclosure relates to improving interference robustness of a downlink channel and an uplink channel in a Long Term Evolution (LTE) based wireless communication system.

BACKGROUND

The global market for both voice and data communication services continues to grow, as does the number of users of the systems which deliver such services. As communication systems evolve, system design has become increasingly demanding in relation to equipment and performance requirements.

Research has demonstrated the vulnerabilities of LTE systems (i.e. LTE, LTE advanced and the like) to mid/narrow band interference specifically on the downstream channel, and with some issues also on the upstream channel. These vulnerabilities are related to the fact that the LTE system uses fixed Orthogonal Frequency Division Multiplexing (OFDM) carriers for specific types of management traffic that relates to initial channel acquisition and to downstream and upstream management.

GENERAL DESCRIPTION

The present disclosure provides a method and a system to improve interference robustness in LTE systems.

Figure 1:
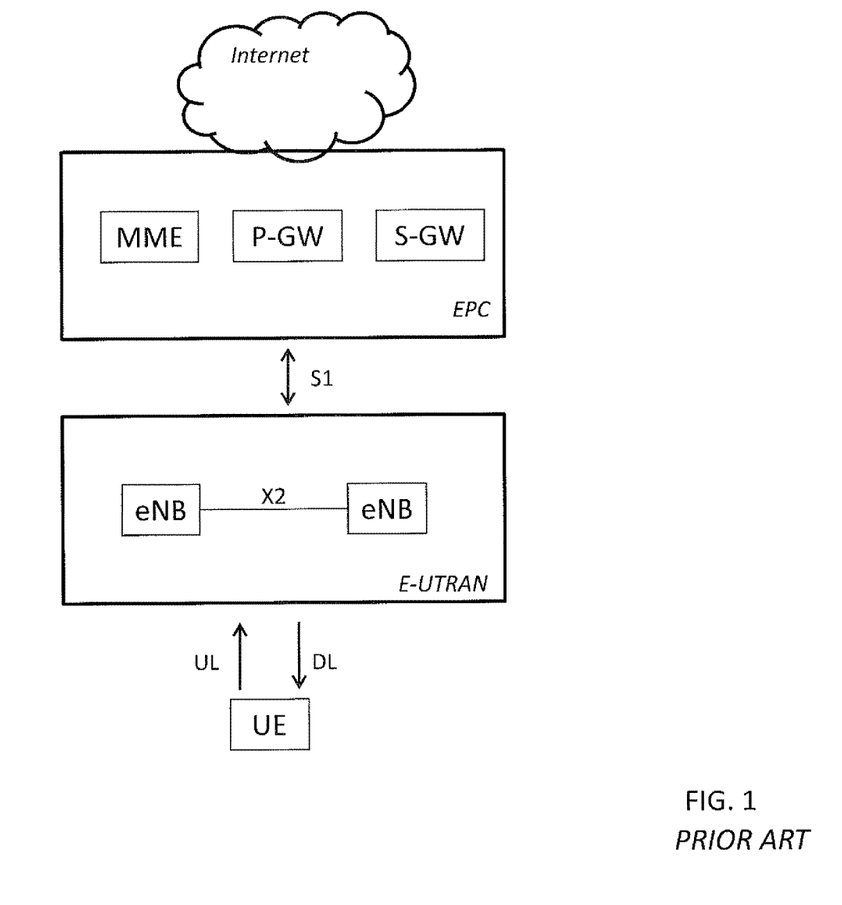
FIG. 1, already described, illustrates generally a LTE network architecture.

FIG. 1 describes generally a LTE communication network. The network comprises the Access Network (AN) and the Core Network (CN). Each network element is interconnected by means of interfaces which are standardized in order to allow multivendor interoperability.

The CN comprises many different logical nodes for example the Evolved Packet Core (EPC). Generally, the network may also include blocks from the classical UMTS architecture (not shown), such as the UTRAN (the UMTS Access Network), the PS and the CS Core Networks, respectively, connected to the public (or any private) IP and Telephone Networks. The IMS (IP Multimedia Subsystem) may be located on top of the Packet Core blocks and provide access to both public or private IP networks, and the public telephone network via Media Gateway network entities. The HSS, managing user subscription information may be a central node, providing services to all Core Network blocks of 3G and evolved 3G architecture. The CN is responsible for overall control of the User Equipment (also referred to as UE or mobile terminal) and the establishment of bearers. A bearer is an IP packet flow with a defined Quality of Service.

The Access Network (also referred to as E-UTRAN) consists of a network of eNodeBs (also referred to as eNB or base station). The eNodeBs are generally interconnected with each other by means of an interface known as X2, and to the EPC by means of an interface known as S1. The protocols which run between the eNodeBs and the UE are known as the Access Stratum (AS) protocols. The eNodeBs are configured to interconnect to the UEs. The link from the UE to the eNB is referred to as Uplink (UL) and the link from the eNB to the UE is referred to as Downlink (DL).

The Access Network is responsible for all radio-related functions, summarized as follows:

Radio resource management. This covers all functions related to radio bearers, particularly: scheduling and dynamic allocation of resources to UEs in both uplink and downlink and also radio bearer control, radio admission control and radio mobility control.

Header compression. This helps to ensure efficient use of the radio interface by compressing the IP packet headers.

Security. All data sent over the radio interface is encrypted.

Positioning. The Access network provides necessary measurements and other data to the Evolved Serving Mobile Location Centre (E-SMLC) of the EPC.

Connectivity to the EPC.

On the network side, all of these functions reside in the eNodeBs, each of which can be responsible for managing multiple cells. Unlike some 2G or 3G technologies, LTE integrates the radio controller function into the eNodeB. This allows tight interaction between the different protocol layers of the radio access network, thus reducing latency and improving efficiency.

Figure 2:
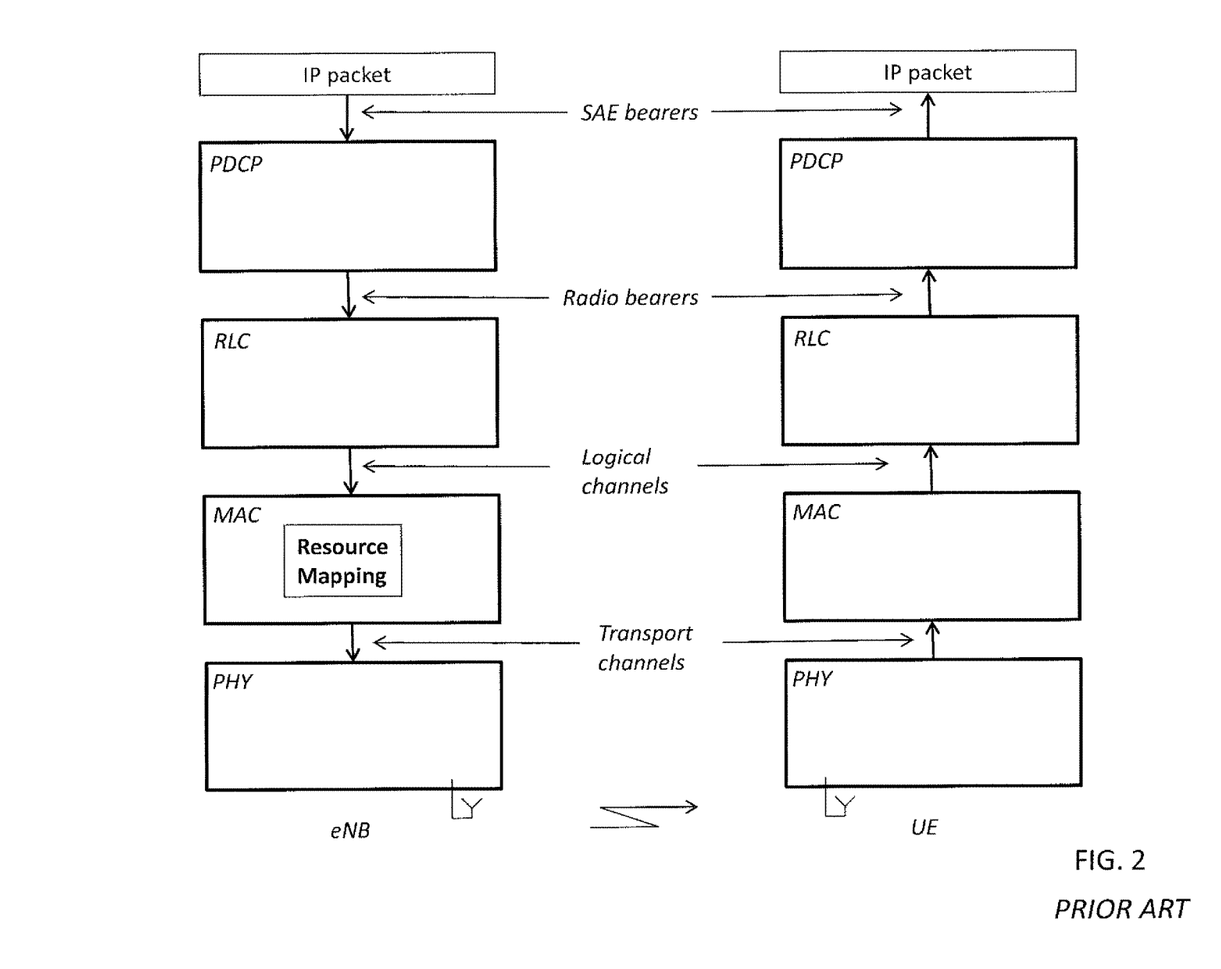
FIG. 2, already described, illustrates a LTE protocol architecture for the Downlink.

FIG. 2 describes a general overview of the LTE protocol architecture for the Downlink (DL). Data to be transmitted in the Downlink enters in the form of IP packets on one of the SAE bearers and are passed through multiple protocol entities prior to transmission over the radio interface. It can be noted that the LTE protocol structure related to uplink transmissions is generally similar to the downlink structure and is therefore not repeated for the sake of conciseness although there are some differences with respect to transport format selection and multi-antenna transmissions. The LTE protocol entities comprise:

Packet Data Convergence Protocol (PRCP) entity which performs IP header compression/decompression to reduce the number of bits necessary to transmit over the radio interface. The PDCP is also responsible for ciphering/deciphering and for integrity of the transmitted data.

Radio Link Control (RLC) entity which is responsible for segmentation/concatenation, retransmission handling and in-sequence delivery to higher layers. The RLC offers services to the PRCP in the form of radio bearers.

Medium Access Control (MAC) entity which handles hybrid-ARQ retransmission and uplink and downlink scheduling. The scheduling functionality is located in the eNodeB, which has one MAC entity per cell, for both uplink and downlink. The MAC offers services to the RLC in the form of logical channels.

Physical Layer (PHY) entity which handles among others coding/decoding, modulation/demodulation, multi-antenna mapping. The PHY layer offers services to the MAC layer in the form of transport channels.

It is noted that there is only one MAC entity per UE. Thus, the UL within the UE has one MAC entity and the eNB executes multiple parallel MAC entities in the DL direction in case the eNB has to handle multiple UEs. Multiplexing of data units from logical channels to transport channels is one of the tasks of the MAC layer.

Furthermore, the scheduling (also referred to as mapping) functionality is performed by a MAC scheduler of the MAC layer. The MAC scheduler maps the resource elements of the set of resource blocks to the symbols to be transmitted on each antenna. The assignment of resource blocks can at least partly be based on estimates of the channel quality of the different resource blocks as seen by the target mobile terminal.

The Applicant has recognized that, in the standard LTE downlink scheduling functionality, a center carrier block of 72 (62 used and 5 sync from each side) carriers is fixedly assigned for the logical channels Primary Synchronization Signal (PSS), Secondary Synchronization Signal (SSS) and Physical Hybrid automatic repeat request Indicator Channel (PHICH). Therefore, advertent or intentional blockage of a large percentage of the carrier in this central carrier block yields failure of the LTE system even when the maximal correction code is used. On the LTE upstream channel the PUCCH (Physical Upstream Control Channel) is assigned fixed carriers within the upstream channel that are located on the two edges of the frequency band. This similarly to the downstream case, creates vulnerability.

The present disclosure provides a method and system that enables to overcome the above limitations. The present disclosure proposes a modification in the eNodeB (eNB) and in the User Equipment (UE). The modification comprises an interface logic between the physical (PHY) layer and the Medium Access Control (MAC) layer of the LTE radio protocol stack. The implementation may be fully proprietary i.e. only operate between modified UEs and eNBs or may support mixed operation with existing UEs and eNBs.

Therefore, the present disclosure provides in a first aspect a method of improving interference robustness in a LTE based wireless communication system wherein, at a transmitting side, a MAC layer outputs MAC data units each including a resource mapping assigning said MAC data units to resource blocks of an LTE frame. The method comprises, at the transmitting side, modifying the MAC data units output by the MAC layer to scramble the resource mapping of said MAC data units thereby providing corresponding scrambled MAC data units including a scrambled resource mapping to a PHY layer of the transmitting side. The scrambled resource mapping is obtained by using a carrier permutation retrievable by a receiving side.

In some embodiments, the method further comprises, at the receiving side, modifying data units output by the PHY layer to neutralize the scrambling of the resource mapping performed at the transmitting side.

In some embodiments, the PHY layer at the receiving side outputs PHY data units corresponding to MAC data units provided to the PHY layer at the transmitting side, each PHY data unit including a logical mapping assigning said PHY data unit to at least one logical transport channel, said logical mapping being based on the resource mapping of the corresponding MAC data unit provided to the PHY layer at the transmitting side, the method further comprising modifying the PHY data units output by the PHY layer at the receiving side to provide corresponding restored PHY data units, each restored PHY data unit including a restored logical mapping, wherein the restored logical mapping is based on the resource mapping of the MAC data unit corresponding to the scrambled MAC data unit which corresponds to said PHY data unit. In other words, one packet provided to the PHY at the transmitting side gives rise to one packet output by the PHY at the receiving side. There is a logical mapping in the packets output by the PHY to the MAC at the receiving side. The logical mapping corresponds to the resource mapping of the transmitted packets. The restored PHY data units sent to the MAC at the receiving side incorporate a logical mapping which corresponds to the resource mapping of the transmitted MAC before scrambling.

In some embodiments, the carrier permutation maintains a timing of said data units established by the MAC layer.

In some embodiments, the carrier permutation is configured to shift one or more carrier blocks as blocks.

In some embodiments, a user equipment being configured to provide a measurement report to a eNodeB, the measurement report associating a set of report carriers with a respective set of measured report carrier values, the method further comprising modifying the measurement report to associate the measured report carrier values with a set of reverse report carriers, wherein the reverse report carriers after scrambling by the carrier permutation correspond to the report carriers.

In some embodiments, when a user equipment operates an initial cell search, the method comprises, at the user equipment side, modifying a radio signal received by the eNodeB to restore the resource mapping established by the MAC layer of the eNodeB before the PHY layer at the user equipment side.

In some embodiments, the modification of the radio signal may be performed by digitizing the radio signal and multiplying the digitized signal so as to cancel the effect of the carrier permutation upstream of the PHY layer.

In another aspect, the present disclosure provides an eNodeB comprising a permutation module configured to operate a permutation layer between a MAC layer and a PHY layer of an LTE protocol architecture operable on the eNodeB. The MAC layer outputs data units each including a resource mapping assigning said data units to resource blocks of an LTE frame. The permutation layer is configured for: on a downlink transmission to a user equipment, modifying data units output by the MAC layer to scramble the resource mapping of said data units, the scrambling being performed according to a eNodeB carrier permutation retrievable by the user equipment, and, on an uplink reception from the user equipment, retrieving a user equipment carrier permutation and modifying data units output by the PHY layer to neutralize the scrambling of the resource mapping performed by the user equipment. The eNodeB may be configured to collaborate with a user equipment as described herein.

In some embodiments, the eNodeB carrier permutation maintains a timing of said data units established by the MAC layer.

In some embodiments, the eNodeB carrier permutation is configured to shift a central carrier block as a block.

In some embodiments, the central carrier block comprises a Primary Synchronization Signal and a Secondary Synchronization Signal.

In another aspect, the present disclosure provides a user equipment comprising a permutation module configured to operate a permutation layer between a MAC layer and a PHY layer of an LTE protocol architecture configured to operate on the user equipment, wherein the MAC layer outputs data units each including a resource mapping assigning said data units to resource blocks of an LTE frame, the permutation layer being configured for: on a downlink transmission from a eNodeB, retrieving a eNodeB carrier permutation and modifying data units output by the PHY layer to neutralize the scrambling of the resource mapping performed by the eNodeB; and, on the uplink transmission to the eNodeB, modifying data units output by the MAC layer to scramble the resource mapping of said data units, the scrambling being performed according to a user equipment carrier permutation retrievable by the eNodeB. The user equipment may be configured to collaborate with the eNodeB previously described.

In some embodiments, the user equipment carrier permutation maintains a timing of said data units established by the MAC layer.

In some embodiments, the user equipment is further configured to provide a measurement report to a eNodeB, the measurement report associating a set of measured report carrier values with a set of reverse report carriers, wherein the reverse report carriers after scrambling by the eNodeB carrier permutation correspond to the report carriers.

In some embodiments, when a user equipment operates an initial cell search, the user equipment is configured to modify a radio signal received by the eNodeB to restore the resource mapping established by the MAC layer of the eNodeB before the PHY layer of the user equipment.

In another aspect, the present disclosure provides a computer program product implemented on a non-transitory computer usable medium having computer readable program code embodied therein to cause the computer to perform a method comprising: providing a MAC layer outputting data units each including a resource mapping assigning said data units to resource blocks of an LTE frame; modifying data units output by the MAC layer to scramble the resource mapping of said data units, the scrambling being performed according to a carrier permutation retrievable by a receiving side.

In another aspect, the present disclosure provides a computer program product implemented on a non-transitory computer usable medium having computer readable program code embodied therein to cause the computer to perform a method comprising modifying data units output by a PHY layer to neutralize a scrambling of a resource mapping performed at a transmitting side by operating a reverse permutation. The scrambling may be the scrambling previously described.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Described herein are some examples of systems and methods useful for improving robustness of a LTE system.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples", "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "coding", "handling", "compressing", "spreading", "transmitting", "amplifying", "performing", "forming", "analyzing", "or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

In the present application, the following terms and their derivatives may be understood in light of the below explanations and in accordance with any definition thereof appearing in the prior art literature:

Access link: a Bi-directional link between a base station and a mobile communication device served thereby. Typically has an uplink portion and a downlink portion, both uni-directional.

Base station (also referred to as relay): one of a plurality of nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base stations and mobile communication devices.

Base station functionality: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base stations and mobile communication devices.

Bi-directional link: a link between levels of a hierarchical communication network which includes both an uplink and a downlink.

Downlink (DL): a uni-directional portion of a link from a base station to a user equipment.

eNodeB (eNB): base station, or base station functionality e.g. in a relay, which uses LTE protocol. Also termed "LTE base station".

Link: Telecommunications or radio link between nodes of a communication network. It is appreciated that a portion, typically uni-directional, of a typically bi-directional link is also sometimes termed a link. There can be one or more channels in a link, e.g. in LTE all the following channels are uplinks: PUCCH, PUSCH, PRACH.

Mobile communication device or user equipment (UE): a portable electronic device which communicates with other such devices or with a terrestrial network via a cellular communication network, typically including allowing users of such devices to converse and/or exchange digital information between them. The device may comprise a dongle.

Permutation: A permutation or permutation function may be seen as a rearrangement of original ordered members of a set. For example, an LTE frame may be composed of resource blocks (predetermined frequency and time portions of the LTE frame) which are mapped/assigned to data to be transmitted by a mapping module of a MAC layer of a LTE transmitter. A permutation function of the resource blocks may refer to a reassignment of the data to be transmitted to different resource blocks. A permutation function may maintain a time assignment of the data while permuting the frequency. This can be seen as a shifting of the resource block along one direction in the LTE frame.

Seed: a number (or vector) used to initialize a pseudo-random number generator. If the same random seed is deliberately shared, it becomes a secret key, so two or more systems using matching pseudorandom number algorithms and matching seeds can generate matching sequences of non-repeating numbers which can be used to synchronize remote systems.

Uplink (UL): a uni-directional portion of a pair of links from a user equipment to a base station.

Figure 3:
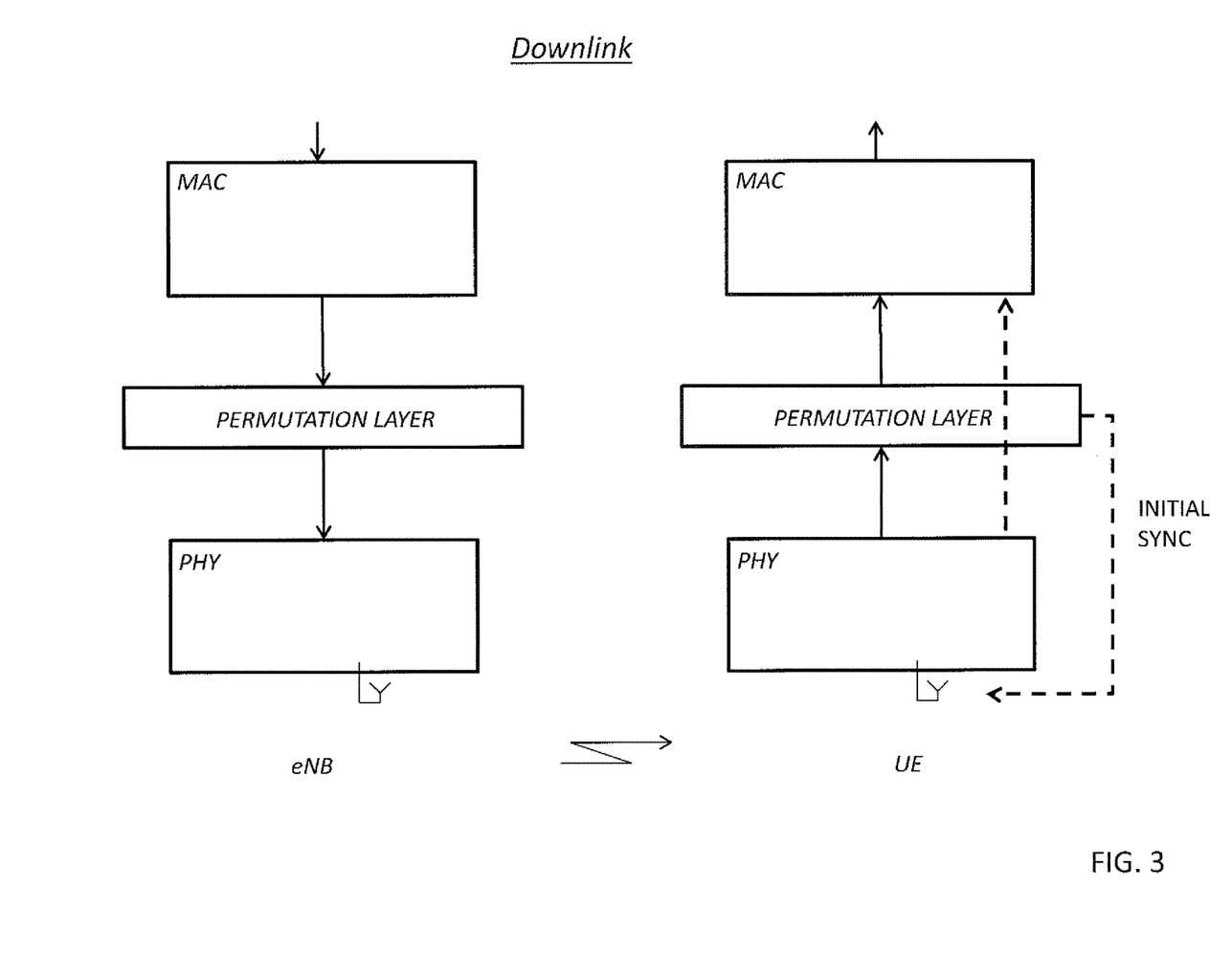
FIG. 3 illustrates elements of a LTE protocol architecture for the Downlink according to embodiments of the present disclosure.

Referring now to FIG. 3, a LTE protocol architecture for a downlink according to embodiments of the present disclosure is described. The LTE protocol architecture may additionally comprise a Permutation layer.

On the eNB side, the Permutation layer may scramble the resource mapping defined by the MAC scheduler. As explained above, for an OFDM or SC-FDMA frame, the resource mapping may be understood as an assignment of resource blocks to bits of data. The resource blocks may be defined as a frequency and time within a frame. Basically, the permutation layer operates a shuffling of the resource blocks assigned by the MAC scheduler so that fixed OFDM carriers which are used in the LTE standard protocol for downstream management and initial channel acquisition vary randomly over time. The scrambling operated by the permutation layer may be operated according to a pseudo-random permutation function. The pseudo-random permutation function may associate each resource block of an OFDM frame assigned by the MAC scheduler with a permutated resource block. As such, the permutation layer may randomly re-assign the resource blocks. The permutation function may keep the timing of the resource blocks as assigned by the MAC scheduler i.e. only the frequencies may be re-assigned while the timing scheduled by the MAC scheduler is maintained. The UE and the eNB may be synchronized. The UE and eNB may share a seed used to initialize the pseudo-random permutation function. Therefore, the eNB and the UE may both know the permutation function so that the shuffling performed by the permutation layer at the eNB may be reversed by the permutation layer at the UE side. Particularly, the shuffling may shuffle the carriers of the PSS/SSS channels. Advantageously, the carriers of the PSS/SSS channels may be permutated as a block and the other carriers may be permutated carrier per carrier or resource block per resource block.

In other words, the standard LTE specification may be understood as defining a mapping from a specific bit N of a logical channel L to a physical carrier C on a symbol S of the physical layer.

This can be expressed as:

$$\text{Carrier} = F(L,N) \cdot C$$

$$\text{Symbol} = F(L,N) \cdot S$$

Wherein F is a mapping function. The mapping function is generally implemented in a mapping module of the MAC scheduler. The mapping module is at the interface between the MAC layer and the PHY layer and the mapping is generally therefore implemented at the end of the scheduling process by linking logical channels and physical carriers.

The present disclosure proposes to modify the mapping from logical MAC channels to physical carriers by defining an additional function which follows the classical mapping function (i.e. at the output of the original mapping function):

$$F_N(\text{CarrierIn}, \text{Symbol}, \text{Seed}) = \text{CarrierOut}$$

Wherein $F_N$ is a permutation that receives a carrier a symbol and a seed. The carrier number may be in the range of $-N/2+1$ to $+N/2$ (DC carrier is not used, 0 represents the carrier below DC). The seed may be synchronized between the eNB and the UE. In other words, a key may be shared between the eNB and the UE in order to generate the shuffling coherently (the permutation may be known or retrievable by both communicating sides). The permutation function $F_N$ may return a carrier number within the same range of input carriers and may map every CarrierIn value to a different non overlapping CarrierOut value.

The resulting (modified) mapping in the system can be expressed as:

$$\text{Carrier} = F_N(F(L,N) \cdot C, F(L,N) \cdot S, \text{Seed})$$

$$\text{Symbol} = F(L,N) \cdot S$$

The modified mapping may not change the number of bits required for sending any one of the logical channels, nor may it change the timing as it maintains the mapping to symbol and only mixes the carrier numbers.

On the UE side, the permutation layer may be configured for reversing the permutation so that the MAC layer receives the packet on a transport channel in accordance with the transport channel assigned by the MAC layer at the eNB side. In other words, the permutation layer may be similarly between the PHY and MAC layers and the permutation $F_{IN}$ on the UE (receiving) side may be such that:

$$F_{IN}(\text{PermC}, S, \text{Seed}) = C$$

Wherein PermC=FN(C, S, Seed) is the permutated carrier output on the eNB side by the permutation layer.

Furthermore, depending on the implementation of the UE radio, there may be an advantage to have the Secondary Synchronization Signal (SSS) and the Primary Synchronization Signal (PSS) grouped together. This may be due to the fact that some radios may be tuned to operate on a narrow band and filter out any noise coming outside of the specific carrier region that carries the PSS and the SSS. Therefore, in some embodiments, the permutation function may operate to permute certain frequencies per block i.e. an image of a block of adjacent carriers by the permutation may be a block of adjacent carriers. For example, for symbols that contain the block of 72 center carriers of the SSS and PSS, the following modification may be provided:

```
OCarrier=F_{N-61}(1, F(L,N).S,Seed) // the permutated offset of the
block of PSS/SSS carriers
    ICarrier=F(L,N).C // carrier as scheduled by MAC
    If(ICarrier>36) then MCarrier=ICarrier-35 and Offset=0 // carrier not
PSS/SSS and above PSS/SSS carriers
    If(ICarrier<-35) then MCarrier=ICarrier+35 and Offset=0 // carrier
not PSS/SSS and below PSS/SSS carriers
    Else MCarrier=1 Offset=ICarrier // carrier is one of PSS/SSS carriers
    TCarrier=F_{N-61}(MCarrier, F(L,N).S, Seed) // performing the
permutation assuming N-71 carriers
    If(Offset>0) then Carrier= TCarrier + Offset // handling of PSS/SSS
    carriers
    Else //handling of non PSS/SSS carriers
    If (TCarrier<OCarrier) then Carrier= TCarrier-35 //shifting location
of carriers below the PSS/SSS block
    Else Carrier = TCarrier +36 //shifting the location of carriers above
the PSS/SSS block
```

The above modification ensures that the block of middle carriers can be permutated as a block and so the radio can maintain a low bandwidth setting when searching for the PSS and SSS signals. The permutation may move the location of the 62 center carriers in the resource grid as a block.

In some embodiments, the downlink may be further modified in order to support initial cell search. Indeed, when the receiver PHY layer is in the initial cell search phase, it is configured to only extract central carriers from the sampled signal and attempt to decode them. This is usually achieved by a digital filter implemented in the LTE PHY layer, as the external radio filters are usually fixed to cover the full channel bandwidth. Therefore, in order to compensate for the shift in the location of these central carriers due to the permutation layer, a simple digital multiplication function can be added before the digital filter is applied i.e. upstream of the PHY layer (as shown by a hashed arrow on FIG. 3). If the PHY is operating in the initial cell search mode then the digital multiplier is selectively activated. The digital multiplier is switched off during normal decoding.

At the UE side, the received signal on the LTE radio may be sampled by an A/D (not shown) with a bandwidth that matches the full signal bandwidth. The digital signal may be passed through the digital multiplier placed upstream of the PHY layer. The digital multiplier implements a mixer functionality and multiplies the incoming signal by a complex sin wave with a specific frequency in order to shift the spectrum of the digital signal according to a modulation frequency of the digital multiplier. The modulation frequency may be controlled by the permutation layer. The digital multiplier may be configured so as to cancel the effect of the permutation layer at the eNB side. The digital multiplier may thereby cancel the effect of the permutation upstream of the PHY layer during the initial cell search phase. The digital multiplier may apply a frequency so that the SSS/PSS channels return to the original frequencies assigned by the MAC scheduler for the SSS/PSS channels. The layer may only activate the multiplier when the PHY layer is in the initial cell search phase. The signal after multiplication may be passed to the PHY layer and decoded. The PHY layer may provide the decoded output to the permutation layer. In the initial cell search phase, the permutation layer does not perform reverse permutation since the received bits have already been shifted by the digital multiplier (as shown by the hashed arrow traversing the permutation layer on FIG. 3).

Figure 4:
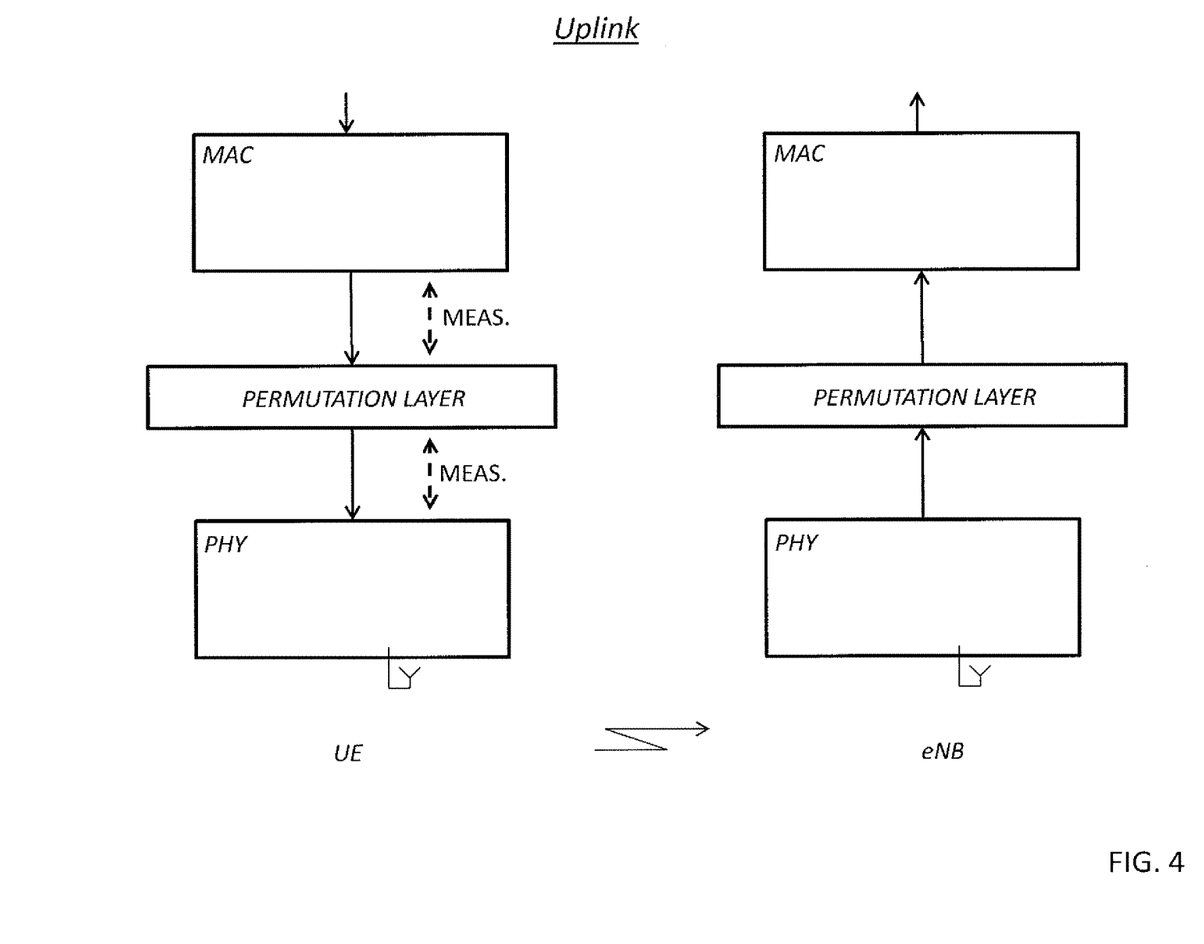
FIG. 4 illustrates elements of a LTE protocol architecture for the Uplink according to embodiments of the present disclosure.

Referring now to FIG. 4, a LTE protocol architecture for an uplink according to embodiments of the present disclosure may also include a permutation Layer.

On the UE side, the basic structure of DFT-Spread-OFDM transmission can be seen as a conventional OFDM transmission combined with Discrete Fourier Transform-based pre-coding. Therefore, similar to OFDM downlink scheme, the uplink DFTS-OFDM physical resource can be seen as a time-frequency grid. As shown on FIG. 4, the permutation layer may scramble the resource mapping defined by the MAC layer. Basically, the permutation layer operates a shuffling of the resource blocks assigned by the MAC layer so that fixed OFDM carriers which are used in the LTE standard protocol for upstream management vary randomly over time. The scrambling operated by the permutation layer may be operated according to a pseudo-random permutation function. The pseudo-random permutation function may associate each resource block assigned by the MAC layer with a permutated resource block. As such, the permutation layer may randomly re-assign the resource blocks. The permutation function may keep the timing of the resource blocks as assigned by the MAC layer i.e. only the frequencies may be re-assigned while the timing scheduled by the MAC layer is maintained. The UE and the eNB may be synchronized. The UE and eNB may share a seed used to initialize the pseudo-random permutation function. Therefore, the eNB and the UE may both know the permutation function and the shuffling of the UE may be reversed at the eNB side.

On the eNB side, the permutation layer may be configured for reversing the permutation so that the MAC layer receives the packet on a transport channel in accordance with the transport channel assigned by the MAC layer at the UE side.

In some embodiments, the handling of measurement reports may also be modified. Traditionally, the LTE standard provides that an eNB may request a UE to send reports on its radio performance. Such reports are created by the MAC layer based on PHY layer measurements. Basically, the UE MAC layer simply wraps a wrapper around these reports and sends them to the eNB.

On the eNB side, the scheduler of the eNB has to be aware of the actual physical channel conditions in order to assign correctly the carriers based on the channel conditions. The MAC layer at the eNB side may request from the UE side a measurement report on the carrier conditions. The MAC layer will typically inquire the PHY layer for these measurements. The PHY layer at the UE side may provide results to the MAC layer at the UE side. The results associate a carrier number and a quality measurement where the carrier number is according to the physical carrier assignment.

In order to handle measurement reports, the permutation layer at the UE side may be configured to permute the carrier numbers in the report using the reverse of the permutation used to scramble the mapping of the MAC scheduler. This enables the eNB to assign carriers based on the quality measurements. Indeed, when the MAC layer at the eNB side assigns a carrier based on the report relating to a carrier $P^{-1}(X)$ (wherein $P^{-1}$ represents the inverse permutation), the effective carrier after permutation at the eNB side by the permutation layer is the carrier X. In other words, when handling measurement reports, the permutation layer permutes the carrier reports so as to match the permutated position of each of the carriers as the MAC sees them by using the inverse (reverse) of the permutation performed for the data carriers that are sent from the MAC through the permutation layer.

In another embodiment, the measurement reports may be transferred as in the classical standard and the eNB PHY layer may be configured to process the measurement reports and hold the latest information on carrier conditions and the eNB MAC layer may be configured to access the eNB PHY layer to collect information for determining the scheduling (assuming the scheduler is implemented on MAC layer) or to get the scheduled map (if the scheduler is implemented on PHY layer). The carrier location reported in this case may need to be inversely permutated.

Furthermore, it is noted that the basic scheme as described in the present disclosure may define a proprietary system that may require both modified eNB and modified UE. The scheme may also be extended to cover coexistence of the original and improved operation schemes i.e. classical LTE mode and interference robust mode according to the present disclosure. The UE can be statically configured to search whether the normal or permutated scheme is used by the network based on a PLMN (Public Land Mobile Network) marking i.e. a label assigned to a PLMN to designate if the permutation is active or not. For example, the UE may be configured to provide an interference robust mode icon to be switched by the user. From the eNB side, the eNB operation simultaneously in both modes can be achieved by sending two sets of logical control channels multiplexed on the same symbols. As an example the PSS & SSS channels may be duplicated where one instance may be transmitted as in the original scheme on the center carriers, while a second set may be transmitted on a shifted offset (permutated block) as determined by the permutation layer. The duplication may extend to all control channels used in the LTE system.

The permutation function may be modified so that it only mixes/scrambles carriers that do not belong to designated control channels of the basic LTE mode and also reserves part of the data carriers for usage of non permutated UEs. Referring to the example above, the center carriers of the symbol carrying the PSS/SSS channels will not be part of the permutated channels. Assuming it is desired to reserve bandwidth for the non-permutated UEs, one can also designate that all carriers from 100-200 may not be permutated and may be used for providing resource blocks for transmission to the non permutated UEs. In other words, in some embodiments, the carriers assigned to control channels may be duplicated. A first version may be transmitted according to the classical LTE mode and a second version may be transmitted according to the interference robust mode on permutated carriers. This reduces transmission capacity but enables to serve both UE in classical LTE mode and in interference robust mode. Further, a split of resources for data transmission between the classical LTE mode and the interference robust mode may be operated.

The split of resources may be coordinated with the permutation UEs. This can be achieved by using fixed predefined setting. As an example all free carriers (carriers not used for control signals) above the center carrier (0) may be used for robust modes, while all the carriers below the center carrier may be used for standard mode. An alternative approach may be to use MBSFN (Multimedia Broadcast Single Frequency Network) type of function on the eNB and then use the MBSFN designated symbols for transmission of permutated symbols. In this scheme, specific symbols in a frame may be used for the permutated operation. For standard UEs, said specific symbols may be defined/perceived as MBSFN symbols that are used for broadcast. Therefore, since a standard UE (not working on permutated mode) may not generally be registered to receive these symbols, a standard UE may disregard the MBFSN symbols. Further, the permutated UEs may be configured to receive a reverse correspondence map designating the specific symbols marked as MBSFN for the standard UEs as standard symbols while the standard symbols may be marked as MBSFN. This can be achieved as the permutated UE and standard UE decode separate copies of the LTE SIBs (System Information Blocks) that define the MBSFN map.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method of improving interference robustness in a Long Term Evolution (LTE) based wireless communication system, the method comprising:
at a transmitting side, a Medium Access Control (MAC) layer outputs MAC data units each including a resource mapping assigning said MAC data units to resource blocks of an LTE frame, modifying the MAC data units output by the MAC layer to scramble the resource mapping of said MAC data units thereby providing corresponding scrambled MAC data units including a scrambled resource mapping to a Physical (PHY) layer of the transmitting side, wherein said modification is performed by a permutation layer between the MAC layer and the PHY layer, wherein the scrambled resource mapping is obtained by using a carrier permutation retrievable by a receiving side, wherein the carrier permutation maintains a timing of said data units established by the MAC layer; and
at the receiving side, retrieving carrier permutation and modifying data units output by the PHY layer to neutralize the scrambling of the resource mapping.

2. The method according to claim 1, further comprising, at the receiving side, modifying data units output by the PHY layer to neutralize the scrambling of the resource mapping performed at the transmitting side.

3. The method according to claim 1, wherein the PHY layer at the receiving side outputs PHY data units corresponding to MAC data units provided to the PHY layer at the transmitting side, each of the PHY data units including a logical mapping assigning the PHY data unit to at least one logical transport channel, said logical mapping being based on the resource mapping of the corresponding MAC data unit provided to the PHY layer at the transmitting side, the method further comprising modifying the PHY data units output by the PHY layer at the receiving side providing corresponding restored PHY data units, each restored PHY data unit including a restored logical mapping, wherein the restored logical mapping is based on the resource mapping of the MAC data unit corresponding to the scrambled MAC data unit which corresponds to said PHY data unit.

4. The method according to claim 1, wherein the carrier permutation is configured to shift one or more carrier blocks as blocks.

5. The method according to claim 1, wherein a user equipment is configured to provide a measurement report to an eNodeB, the measurement report associating a set of report carriers with a respective set of measured report carrier values, the method further comprises modifying the measurement report to associate the measured report carrier values with a set of reverse report carriers, and the reverse report carriers, after scrambling by the carrier permutation, correspond to the report carriers.

6. The method according to claim 1, further comprising: when a user equipment operates an initial cell search, at the user equipment side, modifying a radio signal received by the eNodeB to restore the resource mapping established by the MAC layer of the eNodeB before the PHY layer at the user equipment side.

7. The method according to claim 4, wherein the modification of the radio signal may be performed by digitizing the radio signal and multiplying the digitized signal so as to cancel the effect of the carrier permutation upstream of the PHY layer.

8. An eNodeB comprising:
a permutation module configured to operate a permutation layer between a Medium Access Control (MAC) layer and a Physical (PHY) layer of a Long Term Evolution (LTE) protocol architecture configured to operate on the eNodeB, wherein the MAC layer outputs data units each including a resource mapping assigning said data units to resource blocks of an LTE frame, the permutation layer being configured for:
(a) on a downlink transmission to a user equipment, modifying data units output by the MAC layer to scramble the resource mapping of said data units thereby providing corresponding scrambled MAC data units including a scrambled resource mapping to the PHY layer, the scrambling being performed according to an eNodeB carrier permutation retrievable by the user equipment, wherein the eNodeB carrier permutation maintains a timing of said data units established by the MAC layer; and
(b) on an uplink reception from the user equipment, retrieving a user equipment carrier permutation and modifying data units output by the PHY layer to neutralize the scrambling of the resource mapping performed by the user equipment.

9. The eNodeB according to claim 8, wherein the eNodeB carrier permutation maintains a timing of said data units established by the MAC layer.

10. The eNodeB according to claim 7, wherein the eNodeB carrier permutation is configured to shift a central carrier block as a block.

11. The eNodeB according to claim 9, wherein the central carrier block comprises a Primary Synchronization Signal (PSS) and a Secondary Synchronization Signal (SSS).

12. The eNodeB according to claim 11, wherein the PSS and SSS are grouped together, and the permutation layer permutes a frequency of a non PSS/SSS carrier.

13. A user equipment comprising:
a permutation module configured to operate a permutation layer between a Medium Access Control (MAC) layer and a Physical (PHY) layer of a Long Term Evolution (LTE) protocol architecture configured to operate on the user equipment, wherein the MAC layer outputs data units each including a resource mapping assigning said data units to resource blocks of an LTE frame, the permutation layer being configured for:
(a) on a downlink transmission from an eNodeB, retrieving an eNodeB carrier permutation and modifying data units output by the PHY layer to neutralize the scrambling of the resource mapping performed by the eNodeB; and
(b) on the uplink transmission to the eNodeB, modifying data units output by the MAC layer to scramble the resource mapping of said data units thereby providing corresponding scrambled MAC data units including a scrambled resource mapping to the PHY layer, the scrambling being performed according to a user equipment carrier permutation retrievable by the eNodeB, wherein the carrier permutation maintains a timing of said data units established by the MAC layer.

14. The user equipment according to claim 13, wherein the user equipment carrier permutation maintains a timing of said data units established by the MAC layer.

15. The user equipment according to claim 13, further configured to provide a measurement report to an eNodeB, the measurement report associating a set of measured report carrier values with a set of reverse report carriers, wherein the reverse report carriers, after scrambling by the eNodeB carrier permutation, correspond to the report carriers.

16. The user equipment according to claim 13, wherein when a user equipment operates an initial cell search, the user equipment is configured to modify a radio signal received by the eNodeB to restore the resource mapping established by the MAC layer of the eNodeB before the PHY layer of the user equipment.

17. A computer program product implemented on a non-transitory computer usable medium having computer readable program code embodied therein to cause the computer to perform a method comprising:
at a transmitting side, providing a Medium Access Control (MAC) layer outputting data units each including a resource mapping assigning said data units to resource blocks of a Long Term Evolution (LTE) frame; and
modifying data units output by the MAC layer to scramble the resource mapping of said data units thereby providing corresponding scrambled MAC data units including a scrambled resource mapping to a Physical (PHY) layer, the scrambling being performed according to a carrier permutation retrievable by a receiving side, wherein said modification is performed by a permutation layer between the MAC layer and the PHY layer, wherein the carrier permutation maintains a timing of said data units established by the MAC layer; and
at a receiving side, retrieving carrier permutation and modifying data units output by the PHY layer to neutralize the scrambling of the resource mapping.

18. A computer program product implemented on a non-transitory computer usable medium having computer readable program code embodied therein to cause the computer to perform a method comprising:
at a receiving side, retrieving carrier permutation and modifying data units output by a Physical (PHY) layer to neutralize a scrambling of a resource mapping performed at a transmitting side by operating a reverse permutation, wherein said modification is performed by a permutation layer located between the PHY layer and a Medium Access Control (MAC) layer at the receiving side,
wherein the scrambling is performed according to a carrier permutation retrievable by the receiving side,
wherein said scrambling is performed by a permutation layer between the MAC layer and the PHY layer at the transmitting side thereby providing corresponding scrambled MAC data units including a scrambled resource mapping to the PHY layer, wherein the carrier permutation maintains a timing of said data units established by the MAC layer at the transmitting side.

* * * * *